US009352175B1

(12) United States Patent
Peterson et al.

(10) Patent No.: US 9,352,175 B1
(45) Date of Patent: *May 31, 2016

(54) METHOD AND APPARATUS FOR PROLONGING THE SERVICE LIFE OF A COLLECTIVE PROTECTION FILTER USING A SUPPLEMENTAL BED

(71) Applicant: U.S. Army Edgewood Chemical and Biological Command, APG, MD (US)

(72) Inventors: Gregory W. Peterson, Belcamp, MD (US); Michael A. Pompeii, Fredericksburg, VA (US); Joseph A. Rossin, Columbus, OH (US); Michael J. Knapke, Plain City, OH (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,653

(22) Filed: Apr. 24, 2014

(51) Int. Cl.
*B01D 53/02* (2006.01)
*A62B 23/00* (2006.01)

(52) U.S. Cl.
CPC .................................... *A62B 23/00* (2013.01)

(58) Field of Classification Search
CPC ......... A62B 23/04; B01D 35/00; B01D 46/30
See application file for complete search history.

(56) References Cited

U.S. PATENT DOCUMENTS

| | | | | |
|---|---|---|---|---|
| 4,838,901 | A * | 6/1989 | Schmidt et al. | 95/90 |
| 7,311,752 | B2 * | 12/2007 | Tepper et al. | 55/528 |
| 9,034,289 | B1 * | 5/2015 | Peterson et al. | 423/239.1 |
| 2004/0255785 | A1 * | 12/2004 | Koslow | 96/154 |
| 2008/0026041 | A1 * | 1/2008 | Tepper et al. | 424/445 |
| 2009/0165528 | A1 * | 7/2009 | Qian et al. | 73/1.06 |
| 2010/0047142 | A1 * | 2/2010 | Wood et al. | 423/210 |
| 2011/0308524 | A1 * | 12/2011 | Brey et al. | 128/205.12 |

OTHER PUBLICATIONS

Deitz, Victor R, et al, Influence of Atmospheric Weathering on The Performance of Whetlerite, NRL Memorandum Report 4752, dtd Aug. 20, 1982.

Peterson, Gregory, et al. Removal of Chlorine Gases from Streams of Air Using Reactive Zirconium Hydroxide Based Filtration Media, Industrial & Engineering Chemical Research, 2012, 51, 2675-2681, American Chem Society.

Bandosz, Teresa, et al, Reactions of VX, GD, and HD with Zr(OH)4: Near Instantaneous Decontamination of VX, J. Phys. Chem 2012, vol. 116, 11606-11614, Amer Chem Society.

(Continued)

*Primary Examiner* — Christopher P Jones
(74) *Attorney, Agent, or Firm* — Ulysses John Biffoni

(57) ABSTRACT

A method for extending the service life of a Collective Protection (CP) filter includes: providing at least one CP filter comprising a filter bed; and passing an airstream through a supplemental bed configured to enhance the filter bed by promoting reactions that facilitate the removal of one or more of chemical warfare agents and toxic threat compounds. An apparatus for extending the service life of a Collective Protection (CP) filter, the apparatus including: a CP filter comprising a filter bed; and a supplemental bed configured so as to enhance the filter bed by promoting reactions that facilitate the removal of chemical warfare agents and toxic chemicals.

15 Claims, 1 Drawing Sheet

(56) References Cited

OTHER PUBLICATIONS

Peterson, Gregory, et al, Residual Life Indicator for Physical Adsorption Capacity of NBC Filters Part II Effect of Organic Contaminants on Retention Characteristics of Acetone Vapor Pules, ECBC-TR-623, May 2008.

Friday, David, et al, A Residual Life Indicator (RLI) for Physical Adsorption Capacity of Nuclear, Bioological, and Chemical Filters Part III A Novel RLI Design for Collective Protection Demonstrated Using Breakthough and Chemical Pulse Data, ECBC-TR-658, Nov. 2008.

Peterson, Gregory, et al, Zirconium Hydroxide as a Reactive Substrate for the Removal of Sulfur Dioxide, Ind. Eng. Chec Res, 2009, vol. 48, 1694-1690, American Chemical Society.

Peterson, Gregory, et al, Surface Chemistry and Morphology of Zirconia Polymorphs and the Influence on Sulfur dioxide Removal, J. Phys. Chem, 2011, vol. 115, 9644-9650, Amer Chem Society.

Peterson, Gregory W., et al, Enhanced Cyanogen Chloride Removal by the Reactive Zirconium Hydroxide Substrate, Ind. Eng. Chem Res 2010,vol. 49, 11182-11187.

* cited by examiner

METHOD AND APPARATUS FOR PROLONGING THE SERVICE LIFE OF A COLLECTIVE PROTECTION FILTER USING A SUPPLEMENTAL BED

GOVERNMENT INTEREST

The invention described herein may be manufactured, used and/or licensed by or for the U.S. Government.

CROSS-REFERENCE TO RELATED APPLICATION

This application contains subject matter that is related to the subject matter of the following application, which is assigned to the same assignee as this application. The below-listed application is hereby incorporated herein by reference in its entirety:

"METHOD AND APPARATUS FOR PROLONGING THE SERVICE LIFE OF A COLLECTIVE PROTECTION FILTER USING A GUARD BED," by Peterson, et al., co-filed herewith.

SUMMARY

According to further embodiments of the invention, a method for extending the service life of a CP filter includes: providing a CP filter comprising a filter bed; and passing an airstream through a supplemental bed configured to enhance the filter bed by promoting reactions that facilitate the removal of one or more of chemical warfare agents and toxic threat compounds.

According to still other embodiments of the invention, an apparatus for extending the service life of a CP filter includes: a CP filter comprising a filter bed; and a supplemental bed configured to enhance the filter bed by promoting reactions that facilitate the removal of one or more of chemical warfare agents and toxic threat compounds.

DETAILED DESCRIPTION

Figure 1:
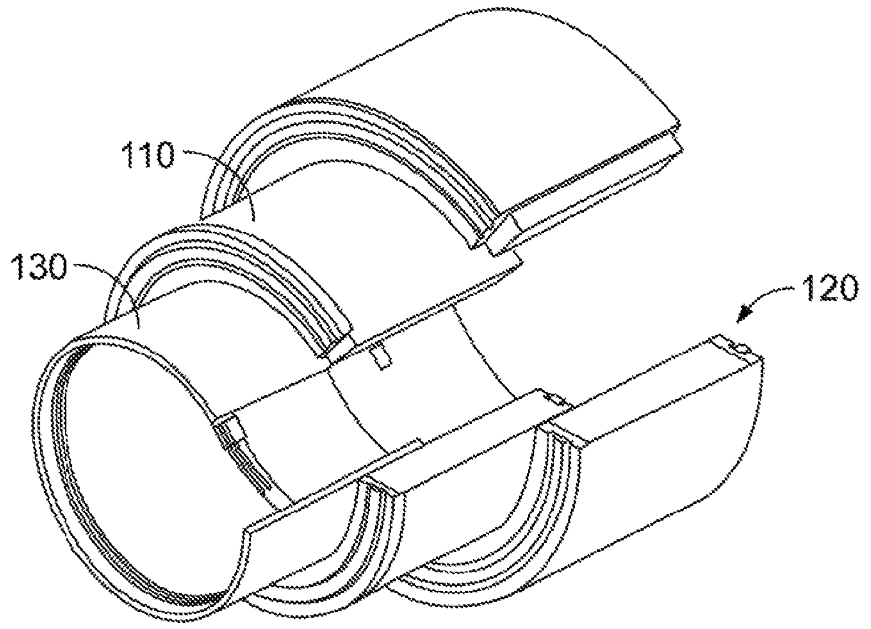
FIG. 1 is a schematic representation of a Supplemental Bed located within an annular space upstream of the collective protection filter.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Collective protection (CP) filters are designed to remove chemical warfare agents and toxic threat compounds from streams of air, thereby providing safe breathing to personnel in a chemically contaminated environment. In their simplest form, a CP filter is a device that allows air to flow through a gas filter bed of activated, impregnated carbon media in a manner that facilitates contact between the airstream and the carbon media. In addition, a particulate filter may be integrated into the CP filter upstream of the gas filter to remove aerosol and particulate matter. CP filters have a high initial capacity for removing chemical warfare agents and other toxic chemicals in the event of a chemical attack. However, such filters may have limited lifetime due to degradation resulting from one or more of exposure to airborne contaminants, exposure to battlefield contaminants, and the natural decay of the filtration media. The CP gas filter may, according to embodiments of the invention, be integrated with a High Efficiency Particulate Absorption (HEPA) filter.

CP filters are used by the US military in conjunction with naval vessels, vehicles, shelters, and buildings to provide breathable air to personnel in the event of a chemical attack. CP filters may be in operation on a continuous or near continuous basis, processing large volumes of air during their lifetime.

CP filters are employed in military and civilian settings. These large-scale filters or filter banks may provide breathable air and chemical protection to personnel located in buildings, ships, vehicles, and mobile tents, for example, during a chemical attack or chemical threat scenario employing chemical warfare agents and/or toxic threat compounds. Examples of chemical warfare agents and toxic threat compounds include hydrogen cyanide (HCN, also known as AC), chlorine gas ($Cl_2$), phosgene ($COCl_2$, also known as CG), cyanogen chloride (ClCN, also known as CK), mustard gas (bis(2-chloroethyl) sulfide, also known as HD), sarin ((RS)-Propan-2-yl methylphosphono-fluoridate, also known as GB) and O-ethyl S-[2-(diisopropylamino)ethyl]methylphosphonothioate (also known as VX).

Ambient air contains low levels of contaminants. Examples of these contaminants include sulfur dioxide ($SO_2$), nitrogen dioxide ($NO_2$) and hydrocarbon vapors such as, for example, diesel fuel, jet fuel, gasoline, and the like. Contaminants have the potential to degrade the performance of the filtration media located within the filter. Contaminant levels may increase depending on the environment, for example, areas where fuel is being transported or on the battlefield.

CP filters are designed so that during a chemical threat—for example, an attack with chemical warfare agents or toxic threat compounds—the CP filter may contact the chemically contaminated process stream with an adsorbent media specifically designed to retain the chemical threat, thereby providing breathable air to personnel. CP filters typically contain activated, impregnated carbon. One example of impregnated carbon is ASC whetlerite, which comprises activated carbon impregnated with copper, chromium and silver. Another example of impregnated carbon is activated, impregnated carbon. When freshly prepared, filtration media may have a high capacity for the removal of chemical agents and toxic threat compounds.

ASC whetlerite comprises a high surface area of activated carbon into whose pores may be dispersed, via a process known as wet impregnation, copper, chromium and silver compounds. ASC whetlerite is prepared via a method similar to that employed in the preparation of activated, impregnated carbon.

CP filters typically operate on a continuous or near continuous basis, processing large volumes of air, for example, greater than approximately 100,000,000 (one hundred million) cubic feet of air per year of operation for an M98 particulate gas filter. Because of the large volume of air processed, over their service life, CP filters may be exposed to significant quantities of one or more of airborne contaminants and battlefield contaminants. These contaminants, while present in low quantities, may, over time, pose a significant hazard.

A filter's ability to remove one or more of chemical warfare agents and toxic chemicals may be decreased by contact with one or more of airborne contaminants and battlefield contaminants. Airborne contaminants may comprise one or more of fuel vapors, sulfur dioxide and nitrogen dioxide, for example. Battlefield contaminants may comprise one or more of fuel vapors, vapors from decontamination solvents, rocket exhaust, smoke and acid vapors, for example. Acid vapors may comprise hydrogen chloride (HCl), which may be a component of rocket exhaust. The decreased chemical protection capability resulting from exposure to one or more of airborne contaminants and battlefield contaminants may be attributed to interactions with the filtration material. Airborne contaminants and battlefield contaminants may degrade filtration performance by, for example, performing one or more of physically blocking pores of the granule, degrading the pore structure, and interacting with impregnants.

Sulfur dioxide and nitrogen dioxide are not only present at low ambient concentrations throughout the world, especially in urban areas, but may be predominant in areas where fuel is burned due to combustion. Once the CP filtration media comes into contact with air comprising one or more of sulfur dioxide and nitrogen dioxide, the filtration media's effective life against other toxic chemicals, such as cyanogen chloride and hydrogen cyanide, may be reduced. Sulfur dioxide will be oxidized within the pores of the carbon granule, leading to the formation of sulfur trioxide ($SO_3$). Sulfur trioxide will subsequently react with one or more base metal impregnants, for example, copper. Such a reaction with copper may lead to the formation of copper sulfate ($CuSO_4$). Copper sulfate may be relatively ineffective in its ability to react with acid gases, for example, hydrogen cyanide.

Nitrogen dioxide may react with the surface of the carbon, forming surface oxygen and liberating nitrogen oxide (NO). Interactions with nitrogen oxide may lead to an acidic carbon surface and degradation in the pore structure. One or more of the acidic surface and the degradation in the pore structure may reduce the ability of activated, impregnated carbon to remove one or more of chemical warfare agents and toxic chemicals. Fuel vapors, while not interacting with the base metal impregnants or the surface of carbon, degrade the performance of the CP filter by physically blocking the pores of activated, impregnated carbon. This physical blocking may prevent access of one or more of chemical warfare agents and toxic chemicals to reactive impregnants that may be located within the pores of the carbon granule. As a result of prolonged exposure to the environment, the media in the collective protection filter becomes contaminated. The contamination may reach a point where the filter may no longer be able to provide a minimum level of chemical protection.

Moreover, according to further embodiments of the invention, the Supplemental Bed comprises one or more media with a high capacity for removal of one or more of chemical warfare agents and toxic threat compounds. According to yet other embodiments of the invention, one effective media for the removal of one one or more of chemical warfare agents and toxic threat compounds may be zirconium hydroxide. According to still other embodiments of the invention, another effective media for the removal of one or more of chemical warfare agents and toxic threat compounds may be zirconium hydroxide loaded with base metals. For example, according to yet further embodiments of the invention, the base metals may comprise one or more of copper, zinc, cobalt, silver and triethylenediamine (TEDA).

The process by which the Supplemental Bed is used involves operating the CP filter until near the end of service life. That is to say, allow the CP filter to degrade (via contaminant exposure and natural processes) to near replacement level. At this time, the Supplemental Bed is installed upstream of the CP filter. The Supplemental Bed will augment the performance of the CP filter by providing additional chemical warfare agent and toxic chemical removal capacity to the package.

Airborne contaminants may degrade the filtration media, and may thereby reduce the lifetime of the CP filter. For example, severe performance degradation of a CP filter has been reported after 21 months of shipboard operation. Performance degradation was attributed to sulfur dioxide contamination of the inlet portion of the filter bed, which led to the formation of metal sulfates.

In addition to CP filter performance degradation resulting from contact with airborne contaminants, performance degradation may occur as a result of natural processes such as exposure to humid air. For example, significant performance degradation of activated, impregnated carbon has been noted as a result of humid exposure.

It is desirable to operate a CP filter for as long as possible before filter change-out becomes inevitable due to performance degradation. Embodiments of the present invention provide a method and apparatus for extending the service life of a collective protection filter.

Filters such as the United States Army's M48A1 particulate gas filter provide protection to vehicles. Filters such as the U.S. Army's M98 particulate gas filter provide protection to buildings and ships. These filters are well known to one skilled in the art.

Embodiments of the invention relate to air purification in general and specifically to apparatuses and methods for extending the service life of a collective protection filter by scrubbing one or more of airborne contaminants and battlefield contaminants.

According to one set of embodiments of the invention, adding a Supplemental Bed may offset performance degradation of the CP filter that may result from one or more of exposure to airborne contaminants, exposure to battlefield contaminants, and the natural decay of the filtration media. It may be desirable to limit the pressure drop across the filter. For example, according to other embodiments of the invention, a pressure drop through the Supplemental Bed is less than approximately 1.0 inches of water. According to yet other embodiments of the invention, to maximize effectiveness, the Supplemental Bed may be of low volume. For example, according to embodiments of the invention, the Supplemental Bed may have a volume less than approximately 25% of the volume of the media in the CP filter bed. According to still further embodiments of the invention, to maximize effectiveness, the Supplemental Bed may employ a filtration media with a high capacity for the removal of one or more of chemical warfare agents and toxic chemicals.

In order to be maximally effective, the Supplemental Bed may be of low volume so as to not significantly increase the pressure drop through the CP filter. For example, according to embodiments of the invention, the Supplemental Bed may have a volume less than approximately 25% of the volume of the media in the CP filter bed.

Therefore, the Supplemental Bed may have a high capacity for the removal of one or more of chemical warfare agents and toxic threat compounds.

According to other embodiments of the invention, examples of possible media comprised in a Supplemental Bed include zirconium hydroxide impregnated with one or more base metals and with TEDA; Cobalt-Zirconium-Zinc-triethylenediamine (Co-ZZT), Cobalt-Zirconium-Zinc-silver-triethylenediamine (Co-ZZAT); other zirconia-based media impregnated with TEDA; TEDA; aluminum hydroxide impregnated with TEDA; and iron hydroxide impregnated with TEDA.

According to embodiments of the invention, the base metals may comprise, for example, one or more of zinc, cobalt, copper, chromium, iron, silver, molybdenum, potassium, magnesium, sodium, and nickel. These media may be highly effective in their ability to remove one or more of airborne contaminants and battlefield contaminants. These media may also be highly effective in their ability to promote reactions that facilitate the removal of one or more of chemical warfare agents and toxic chemicals. One or more of activated carbon and zeolites may have a high capacity for the removal of organic vapors, such as fuel vapors.

According to yet other embodiments of the invention, the Supplemental Bed may be located upstream of the CP filter. According to yet other embodiments of the invention, the Supplemental Bed may be located downstream of the CP filter. According to still further embodiments of the invention, the CP filter comprises the Supplemental Bed.

According to embodiments of the invention, the Supplemental Bed may be added to the CP filter after the CP filter degrades to approximately replacement level. According to further embodiments of the invention, the Supplemental Bed may be added at a location that may allow for contact between the process steam and the media comprised in the Supplemental Bed.

According to the embodiments of the invention, the Supplemental Bed may be added to the CP filter into the process stream upon the appearance of an imminent chemical threat. According to further embodiments of the invention, a greater level of protection capability to personnel may thereby be provided in the event of a chemical attack.

According to embodiments of the invention, the Supplemental Bed may comprise any media capable of removing one or more of chemical warfare agents and toxic chemicals. For example, the Supplemental Bed may comprise activated, impregnated carbon, for example, one or more of activated, impregnated carbon and ASC whetlerite, may be employed.

According to embodiments of the invention, the Supplemental Bed may comprise a high capacity filtration media.

The Supplemental Bed may be of several shapes and configurations, as long as the Supplemental Bed facilitates contact between the process stream and the media located within the Supplemental Bed. According to embodiments of the invention, media employed in the Supplemental Bed may be contained within a packed bed. According to other embodiments of the invention, media employed in the Supplemental Bed may be immobilized in webbing, such as that comprised of low-melt fibers. According to embodiments of the invention, the Supplemental Bed may be located upstream of the CP filter. According to alternative embodiments of the invention, the Supplemental Bed may be located downstream of the CP filter.

According to yet other embodiments of the invention, the Supplemental Bed may be designed to be integrated within the current CP filter. For example, the M98 particulate gas filter employed by the US military has a radial flow design. With such a radial flow filter, the process stream enters from the center of the cylindrical filter bed and the flow is diverted outward in a radial direction. Flow may first enter the CP filter, where particulate matter may be removed as the process stream passes through the HEPA filter. Afterwards, flow enters a filter bed of activated, impregnated carbon, for example, CWS whetlerite or activated, impregnated carbon. According to further embodiments of the invention, when the CP filter is at or near the end of its service life, or when a chemical attack is imminent and added chemical protection is desired, a Supplemental Bed may be installed upstream of the CP filter. According to yet further embodiments of the invention, the Supplemental Bed may comprise a filtration media with a high capacity for the removal of chemical warfare agents and toxic threat compounds. According to other embodiments of the invention, the Supplemental Bed may be configured to fit inside the CP filter. According to yet further embodiments of the invention, the resulting pressure drop through the Supplemental Bed may be less than approximately 1.0 inches of water.

According to still further embodiments of the invention, the media for the Supplemental Bed may comprise zirconium hydroxide loaded with cobalt, zinc, silver, and TEDA (Co-ZZAT). According to yet other embodiments of the invention, the media may comprise between approximately 0% and 10% cobalt by weight. According to still other embodiments of the invention, the media may comprise between approximately 10% and 30% zinc by weight. According to still other embodiments of the invention, the media may comprise between approximately 0% and 2% silver by weight. According to further embodiments of the invention, the media may comprise between approximately 1% and 10% TEDA by weight. According to other embodiments of the invention, the media may comprise between approximately 5% and 7% TEDA by weight.

According to further embodiments of the invention, techniques to prepare cobalt-zinc containing zirconium hydroxide may include one or more of wet impregnation and precipitation. Precipitation may involve contacting a slurry of zirconium hydroxide with a solution of one or more of cobalt salt and zinc salt. The pH of the slurry may then be adjusted to bring about precipitation of the cobalt and zinc within the pores of the zirconium hydroxide. For example, a solution of one or more of cobalt sulfate and zinc sulfate may be contacted with a slurry of zirconium hydroxide. One or more of the zinc and cobalt may be precipitated by contacting the slurry with a base for example, sodium hydroxide or potassium hydroxide, yielding one or more of the corresponding base metal hydroxides.

Following precipitation, the zirconium hydroxide containing one or more of cobalt and zinc may be filtered. The zirconium hydroxide may be washed with deionized water. The zirconium hydroxide may then be dried to less than 5% moisture by weight. The dried powder may then be blended in a vessel with the desired amount of TEDA at a temperature sufficient to bring about sublimation of TEDA into the pores of the solid. For example, the vessel may be a V-blender operated at a temperature between room temperature and approximately 100° C.

According to yet other embodiments of the invention, zirconium hydroxide may be prepared by precipitation using, for example, one or more of zirconium oxychloride, zirconium oxynitrate, and zirconium acetate. Precipitation may involve slurrying the zirconium solution in a mixer, then adding a base—for example, one or more of sodium hydroxide (NaOH), potassium hydroxide (KOH), and lithium hydroxide (LiOH). The addition of the base may precipitate the zirconium hydroxide. Alternatively, zirconium hydroxide may be obtained from commercial sources, such as MEL Chemicals of Flemington, N.J.

In an additional set of embodiments of the invention, a method and apparatus are provided that combine a Supplemental Bed with a Guard Bed as disclosed in "METHOD AND APPARATUS FOR PROLONGING THE SERVICE LIFE OF A COLLECTIVE PROTECTION FILTER USING A GUARD BED," by Peterson, et al., co-filed herewith. At the time the performance of the CP filter degrades to at or near replacement levels (as a result of contaminants that escape the Guard Bed combined with the natural decay of the media), the Guard Bed may be removed and replaced with the Supplemental Bed.

FIG. 1 is a schematic representation of a Collective Protection (CP) filter that includes a gas filter bed 120, a particulate filter bed 110, and a Supplemental Bed 130. The gas filter bed 120 may be a carbon-based gas filter bed 120. The Supplemental Bed 130 enhances the gas filter bed 120 by promoting reactions that facilitate the removal of one or more of chemical warfare agents and toxic threat compounds. The Supplemental Bed 130 is, for example, located within an annular space upstream of the particulate filter 110 and upstream of the gas filter bed 120. In this embodiment the filters are again shown in a nested configuration with a radially outward airflow. Air flows through the center of and exits radially through the Supplemental Bed 130, then through the particulate filter 110, then through the gas filter bed 120. It is also possible to integrate the Supplemental Bed with the CP filter.

Figure 2:
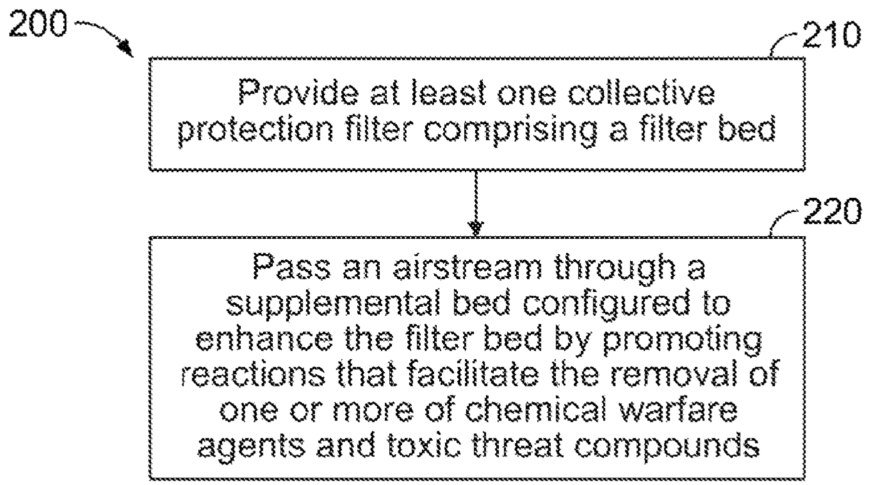
FIG. 2 is a flowchart of a method for extending the service life of a CP filter using a Supplemental Bed.

FIG. 2 is a flowchart of a method 200 for extending the service life of a collective protection (CP) filter using a Supplemental Bed. The order of the steps in the method 200 is not constrained to that shown in FIG. 2 or described in the following discussion. Several of the steps could occur in a different order without affecting the final result.

In block 210, a CP filter comprising a filter bed is provided.

In block 220, an airstream is passed through a Supplemental Bed configured to enhance the filter bed by promoting reactions that facilitate the removal of one or more of chemical warfare agents and toxic threat compounds. Block 220 then terminates the process.

EXAMPLES

Example 1

Filtration Performance of Contaminated Activated, Impregnated Carbon (No Supplemental Bed)

This example illustrates performance degradation of a filter bed comprising activated, impregnated carbon resulting from contact with airborne contaminants. The ambient levels of sulfur dioxide are assumed to be approximately 10 parts per billion (ppb). Ambient levels of nitrogen dioxide are assumed to be approximately 20 ppb. The ambient concentration of diesel fuel in urban areas is assumed to be approximately 0.15 mg/m$^3$.

A filter bed that was approximately 2.0 cm in depth with 12×30 mesh granules of activated, impregnated carbon was exposed to nitrogen dioxide for up to approximately four years of simulated ambient exposure at a residence time of approximately 0.21 seconds, which is consistent with the residence time encountered in a CP filter. Upon completion of the exposure, the filter bed was evaluated for its ability to remove hydrogen cyanide and cyanogen chloride.

The point in time at which the effluent concentration equals the breakthrough concentration is referred to as the "breakthrough time." The breakthrough time is used to characterize filtration performance of media. Breakthrough times are presented in Table 1. Because cyanogen ($C_2N_2$) is generated as a byproduct, the cyanogen breakthrough time is taken as the breakthrough time from the hydrogen cyanide test. Breakthrough time is a term known by one skilled in the art to be defined as the time in which the effluent concentration of a toxic vapor exceeds a threshold level.

TABLE 1

Hydrogen cyanide and cyanogen chloride breakthrough times for activated, impregnated carbon following periods of simulated atmospheric exposure to nitrogen dioxide. Breakthrough times are given in minutes.

| Duration | HCN | $C_2N_2$ | ClCN |
|---|---|---|---|
| Fresh Media | 24.3 | 20.4 | 26.4 |
| 6 months | 25.3 | 20.7 | 23.4 |
| 1 year | 23.4 | 19.1 | 23.9 |
| 2 years | 21.2 | 16.6 | 16.8 |
| 3 years | 18.8 | 12.3 | 13.7 |
| 4 years | 16.3 | 8.3 | 8.6 |

The results demonstrate that exposure of activated, impregnated carbon to prolonged ambient levels of nitrogen dioxide results in significant filtration performance degradation.

A filter bed that was approximately 2.0 cm in depth with 12×30 mesh activated, impregnated carbon was exposed to sulfur dioxide for up to approximately four years of simulated ambient exposure. Upon completion of the exposure, the filter bed was evaluated for its ability to remove hydrogen cyanide and cyanogen chloride. Breakthrough times are presented in Table 2. Again, because cyanogen is generated as a byproduct, the cyanogen breakthrough time is taken as the breakthrough time from the hydrogen cyanide test. Breakthrough time is a term known by one skilled in the art to be defined as the time in which the effluent concentration of a toxic vapor exceeds a threshold level.

TABLE 2

Hydrogen cyanide and cyanogen chloride breakthrough times for activated, impregnated carbon following periods of simulated atmospheric exposure to sulfur dioxide. Breakthrough times are given in minutes.

| Duration | HCN | $C_2N_2$ | ClCN |
|---|---|---|---|
| Fresh Media | 24.4 | 20.5 | 25.4 |
| 1 year | 22.2 | 18.3 | 23.4 |
| 2 years | 19.2 | 15.1 | 22.9 |
| 3 years | | | 20.1 |
| 4 years | 15.9 | 11.1 | 17.6 |

The results demonstrate that exposure of activated, impregnated carbon to prolonged ambient levels of sulfur dioxide results in significant filtration performance degradation.

A filter bed that was approximately 2.0 cm in depth with 12×30 mesh activated, impregnated carbon was exposed to diesel vapors for up to approximately four years of simulated ambient exposure. Upon completion of the exposure, the filter bed was evaluated for its ability to remove hydrogen cyanide and cyanogen chloride. Breakthrough times are presented in Table 3. Again, because cyanogen is generated as a byproduct, the cyanogen breakthrough time is taken as the breakthrough time from the hydrogen cyanide test.

TABLE 3

Hydrogen cyanide and cyanogen chloride breakthrough times for activated, impregnated carbon following periods of simulated atmospheric exposure to diesel vapors. Breakthrough times are given in minutes.

| Duration | HCN | $C_2N_2$ | ClCN |
|---|---|---|---|
| Fresh Media | 24.3 | 20.4 | 25.4 |
| 1 year | 25.1 | 17.4 | 17.7 |

TABLE 3-continued

Hydrogen cyanide and cyanogen chloride breakthrough times for activated, impregnated carbon following periods of simulated atmospheric exposure to diesel vapors. Breakthrough times are given in minutes.

| Duration | HCN | $C_2N_2$ | ClCN |
|---|---|---|---|
| 2 years | 21.9 | 18.2 | 15.3 |
| 3 years | 19.4 | 15.3 | 14.6 |
| 4 years | 13.2 | 8.2 | 11.7 |

The results demonstrate that exposure of activated, impregnated carbon to prolonged ambient levels of diesel fuel vapors result in significant filtration performance degradation.

A filter bed that was approximately 2.0 cm in depth with 12×30 mesh activated, impregnated carbon was exposed to a mixture of sulfur dioxide, nitrogen dioxide, and diesel vapors for up to approximately five years of simulated ambient exposure. Upon completion of the exposure, the filter bed was evaluated for its ability to remove hydrogen cyanide and cyanogen chloride. Breakthrough times are presented in Table 4. Again, because the cyanogen is generated as a byproduct, the cyanogen breakthrough time is taken from the hydrogen cyanide challenge.

TABLE 4

Hydrogen cyanide and cyanogen chloride breakthrough times for activated, impregnated carbon following periods of simulated atmospheric exposure to mixtures of nitrogen dioxide, sulfur dioxide and diesel vapors. Breakthrough times are given in minutes.

| Duration | HCN | $C_2N_2$ | ClCN |
|---|---|---|---|
| Fresh Media | 24.3 | 20.4 | 25.4 |
| 1 year | 21.1 | 15.6 | 18.3 |
| 2 years | 17.8 | 10.1 | 11.5 |
| 3 years | 13.5 | 4.4 | 7.1 |
| 4 years | 10.3 | 2 | 2.8 |
| 5 years | 6.3 | 0.1 | 0.8 |

The results demonstrate that the exposure of a filter bed comprising activated, impregnated carbon to prolonged ambient levels of a mixture of airborne contaminants and battlefield contaminants results in significant filtration performance degradation.

Example 2

Preparation of Co-ZZAT for Use with a Supplemental Bed

Co-ZZAT is prepared for use with a Supplemental Bed in a similar manner to the method described in Example 2, with the exception that silver is also added during the precipitation operation. A zinc-cobalt solution is prepared by dissolving approximately 34 pounds of zinc oxide (ZnO) in approximately 30 gallons of DI water while mixing the components using sulfuric acid. Once completely dissolved, approximately 28.2 pounds of cobalt sulfate was added and dissolved using mixing. The total volume of the solution was then brought to approximately 50 gallons. A silver nitrate solution is then prepared by dissolving approximately 429 grams of silver nitrate in approximately four gallons of DI water.

To a 500-gallon vessel, approximately 120 gallons of DI water were added. Approximately 200 pounds (dry basis) of zirconium hydroxide were then added to the DI water. During the precipitation, the temperature of the slurry was controlled at approximately 20±3° C. Using a 50% potassium hydroxide solution, the pH of the slurry was then increased to approximately 11.0. The slurry was mixed for approximately two hours prior to initiating the precipitation. Following the two hours of mixing, the precipitation of the zinc-cobalt was initiated. The precipitation was initiated by pumping the zinc-cobalt solution into the slurry at a rate of approximately 1 gallon per minute. A solution of approximately 30% potassium hydroxide was then pumped into the slurry at a rate sufficient to maintain a near-constant pH of approximately 11.0 during precipitation. Upon completion of the precipitation, the slurry was then mixed for approximately four additional hours, and then was allowed to stand overnight. The amount of cobalt and zinc added to the slurry yielded a product with a nominal composition of approximately 17 parts by weight zinc, approximately 3 parts by weight cobalt, approximately 0.3 parts by weight silver, and approximately 100 parts by weight zirconium hydroxide.

In the morning, the product was filtered, and then was reslurried with approximately 200 gallons of DI water for the purpose of washing residual potassium and sulfate from the product. The washed product was then filtered and dried in a forced convection oven to less than approximately 5% moisture at a temperature of approximately 80° C.

Approximately 85 pounds of dried cobalt-zinc-zirconium hydroxide powder was then added to a V-blender, along with the target mass of TEDA necessary to achieve a loading of approximately 6%. While mixing, the V-blender was sealed and heated to approximately 60° C. To complete the TEDA sublimation, the temperature was maintained for approximately five hours. Following the approximately five hours of mixing, the V-blender and contents were allowed to cool to room temperature while mixing.

Upon completion of the TEDA sublimation operation, the powder was forwarded for particle formation. Particle formation was performed by adding the powder (referred to as Co-ZZAT) to the roll compactor in order to make briquettes. The powder is referred to as Co-ZZAT based on its components of cobalt (Co), zirconium hydroxide (Z), zinc (Z), silver (for which Ag is the chemical symbol), and TEDA. The briquettes were then ground using a hammer mill. The product was sieved to generate 20×40 mesh granules. The density of the 20×40 mesh granules was approximately 1.2 g/cm$^3$.

Example 3

Breakthrough Times for Toxic Chemicals Using Co-ZZAT and Activated, Impregnated Carbon This example illustrates the ability of Co-ZZAT to remove one or more of chemical warfare agents and toxic threat compounds. For tests performed at a relative humidity of approximately 80%, prior to initiating testing, the filtration media was pre-humidified to a relative humidity of approximately 80%. For tests performed with all other values of relative humidity, the media was used as prepared. 20×40 mesh granules of media were added to a test cell with a diameter of approximately 4.1 cm, so as to achieve a filter bed depth of approximately 1.0 cm. The filter bed was challenged with approximately 4,000 mg/m$^3$ of cyanogen chloride in air at a relative humidity of approximately 80% and at a temperature of approximately 25° C. The flow rate through the Supplemental Bed was approximately 5.2 liters/min air, referenced to 25° C., to achieve a linear velocity of approximately 6.6 cm/s. The effluent concentration of cyanogen chloride was monitored until the effluent concentration exceeded the breakthrough concentration of approximately 8 mg/m$^3$.

The breakthrough test was repeated using fresh media challenged with approximately 4,000 mg/m$^3$ of hydrogen cyanide in air at a relative humidity of approximately 50%. The effluent concentrations of hydrogen cyanide and of cyanogen ($C_2N_2$—a potential byproduct of hydrogen cyanide reactions with basic copper complexes) were monitored until at least one of the effluent concentrations of hydrogen cyanide and of cyanogen exceeded the breakthrough concentration of approximately 5 mg/m$^3$. The test was repeated at 80% RH.

The breakthrough test was repeated using fresh media challenged with approximately 4,000 mg/m$^3$ of chlorine gas in air at a relative humidity of approximately 15%. The effluent concentrations of chlorine and of product hydrogen chloride were monitored until the effluent concentration of one of the two gases exceeded the breakthrough concentration of approximately 2 mg/m$^3$.

The breakthrough test was repeated using fresh media challenged with approximately 2,000 mg/m$^3$ of sulfur dioxide in air at a relative humidity of approximately 15%. The effluent concentration of sulfur dioxide was monitored until the effluent concentration exceeded the breakthrough concentration of approximately 13 mg/m$^3$. Table 5 compares breakthrough times recorded using Co-ZZAT to breakthrough times recorded using activated, impregnated carbon.

TABLE 5

Summary of Breakthrough Times for Toxic Chemicals using Co-ZZAT and activated, impregnated carbon.

| | Breakthrough Time | |
|---|---|---|
| Chemical | Co-ZZAT 20 × 40 mesh | ACTIVATED IMPREGNATED CARBON 20 × 40 mesh |
| ClCN (80% RH) | 36.2 min | 19.3 min |
| HCN (50% RH) | 39.9 min | 16.9 min$^2$ |
| HCN (80% RH) | 42.3 min | 12.9 min$^2$ |
| $Cl_2$ | 44.1 min | 38.5 min |
| $SO_2$ | 120 min | 31.1 min |

The results demonstrate the superior filtration performance of Co-ZZAT relative to activated, impregnated carbon.

Example 4

Filtration Performance of Activated, Impregnated Carbon with Supplemental Bed A filter bed that was approximately 2.0 cm in depth with 12×30 mesh activated, impregnated carbon was exposed to a mixture of sulfur dioxide, nitrogen dioxide, and diesel vapors for up to approximately five years of simulated ambient exposure in a manner consistent with Example 1.

Upon completion of the discrete exposures, a Supplemental Bed comprising an approximately 0.12 cm deep layer of 20×40 mesh Co-ZZAT was installed above the 2.0 cm deep filter bed of activated, impregnated carbon. The filter bed was evaluated for its ability to remove hydrogen cyanide. Breakthrough times are presented in Table 6. Again, because the cyanogen is generated as a byproduct, the cyanogen breakthrough time is taken from the hydrogen cyanide challenge.

TABLE 6

Hydrogen cyanide breakthrough times for activated, impregnated carbon following periods of simulated atmospheric exposure to mixtures of nitrogen dioxide, sulfur dioxide and diesel vapors, with a Supplemental Bed depth of approximately 0.12 cm. Breakthrough times are given in minutes.

| Exposure | No Supplemental Bed | | With 0.12 cm deep Co-ZZAT Supplemental Bed | |
|---|---|---|---|---|
| Duration | HCN | $C_2N_2$ | HCN | $C_2N_2$ |
| Fresh | 24.3 | 20.4 | | |
| 2 years | 17.8 | 10.1 | 20.7 | 13.6 |
| 4 years | 10.3 | 2.0 | 13.8 | 5.2 |
| 5 years | 6.3 | 0.1 | 9.6 | 1.7 |

Upon completion of the discrete exposures to airborne contaminants, a Supplemental Bed comprising an approximately 0.17 cm deep layer of 20×40 mesh Co-ZZAT was installed above the 2.0 cm deep bed of activated, impregnated carbon. The filter bed was evaluated for its ability to remove hydrogen cyanide. Breakthrough times are presented in Table 7. Because the cyanogen is generated as a byproduct, the cyanogen breakthrough time is reported.

TABLE 7

Hydrogen cyanide breakthrough times for activated, impregnated carbon following periods of simulated atmospheric exposure to mixtures of nitrogen dioxide, sulfur dioxide and diesel vapors, with a Supplemental Bed depth of approximately 0.17 cm. Breakthrough times are given in minutes.

| Exposure | No Supplemental Bed | | With 0.17 cm deep Co-ZZAT Supplemental Bed | |
|---|---|---|---|---|
| Duration | HCN | $C_2N_2$ | HCN | $C_2N_2$ |
| Fresh | 24.3 | 20.4 | | |
| 2 years | 17.8 | 10.1 | 24.1 | 17.6 |
| 4 years | 10.3 | 2 | 17.0 | 7.5 |
| 5 years | 6.3 | 0.1 | 11.4 | 1.4 |

The results demonstrate that while exposure to airborne contaminants rapidly degrades the filtration performance of activated, impregnated carbon, incorporation of the Supplemental Bed increases the filtration performance, thus extending the service life of the filter. The magnitude of the increase is larger when the Supplemental Bed is approximately 0.17 cm deep than when it is approximately 0.12 cm deep.

As the above examples demonstrate, the Supplemental Bed is able to remove a significant fraction of the chemical warfare agents and toxic threat compounds, and is thus expected to extend the service life of the CP filter.

While the above representative embodiments have been described with certain components in exemplary configurations, it will be understood by one of ordinary skill in the art that other representative embodiments can be implemented using different configurations and/or different components.

Alternative embodiments of the invention may utilize systems different from the system depicted in FIGS. 1 and 2.

Alternative embodiments of the invention may comprise alternative media. Other alternative embodiments of the invention may comprise alternative locations of the Supplemental Bed. Yet other alternative embodiments of the invention may comprise use of more than one Supplemental Bed.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

What is claimed is:

1. An apparatus for extending the service life of a Collective Protection (CP) filter, the apparatus comprising:

a CP filter comprising a filter bed; and a supplemental bed configured so as to enhance the service life of the filter bed by promoting reactions that facilitate the removal of chemical warfare agents and toxic chemicals, wherein the supplemental bed comprises one or more of zirconium hydroxide ($Zr(OH)_4$) impregnated with one or more base metals and with triethylenediamine TEDA), cobalt-zirconium-zinc-triethylenediamine (Co-ZZT), cobalt-zirconium-zinc-silver-triethylenediamine (Co-ZZAT); other zirconium-based (ZB) media impregnated with TEDA; aluminum hydroxide impregnated with TEDA; and iron hydroxide impregnated with TEDA.

2. The apparatus of claim 1, wherein the base metals comprise one or more of zinc, cobalt, copper, chromium, iron, silver, molybdenum, potassium, magnesium, sodium, and nickel.

3. The apparatus of claim 1, wherein the supplemental bed comprises at least one media that is immobilized in webbing.

4. The apparatus of claim 1, wherein the supplemental bed is located upstream of the filter bed.

5. The apparatus of claim 1, wherein the supplemental bed is located downstream of the filter bed.

6. The apparatus of claim 1, wherein the supplemental bed is incorporated with or integral to the CP filter.

7. The apparatus of claim 1, wherein the supplemental bed is replaceable.

8. The apparatus of claim 1, wherein the supplemental bed has a volume less than approximately 25% of the volume of the media in the filter bed.

9. The apparatus of claim 1, wherein a pressure drop through the supplemental bed is less than approximately 1.0 inches of water.

10. The apparatus of claim 1, wherein the supplemental bed comprises cobalt-zirconium-zinc-silver-triethylenediamine (Co-ZZAT).

11. The apparatus of claim 10, wherein the supplemental bed comprises between approximately 0% and approximately 10% cobalt by weight.

12. The apparatus of claim 10, wherein the supplemental bed comprises between approximately 1% and approximately 30% zinc by weight.

13. The apparatus of claim 10, wherein the supplemental bed comprises between approximately 0% and approximately 2% silver by weight.

14. The apparatus of claim 10, wherein the supplemental bed comprises between approximately 1% and approximately 10% TEDA by weight.

15. The apparatus of claim 1, wherein said chemical warfare agents and toxic chemicals include hydrogen cyanide (HCN, also known as AC), chlorine gas ($Cl_2$), phosgene ($COCl_2$, also known as CO), cyanogen chloride (ClCN, also known as CK) mustard gas (bis(2-chloroethyl) sulfide, also known as HD), sarin ((RS)-Propan-2-yl methylphosphonofluoridate, also known as GB) and O-ethyl S-[2-(diisopropylamino)ethyl]methylphosphonothioate (also know as VX).

* * * * *